Jan. 6, 1925.

E. J. CROSSEN 1,522,421

APPARATUS FOR THE DESTRUCTIVE DISTILLATION OF COAL AND THE LIKE

Filed May 16, 1917

INVENTOR
Elmer J. Crossen
BY
ATTORNEYS

Jan. 6, 1925.  1,522,421
E. J. CROSSEN
APPARATUS FOR THE DESTRUCTIVE DISTILLATION OF COAL AND THE LIKE
Filed May 16, 1917   5 Sheets-Sheet 2

INVENTOR
Elmer J. Crossen
BY
ATTORNEY

Jan. 6. 1925.                                                1,522,421
E. J. CROSSEN
APPARATUS FOR THE DESTRUCTIVE DISTILLATION OF COAL AND THE LIKE
Filed May 16, 1917                     5 Sheets-Sheet 3
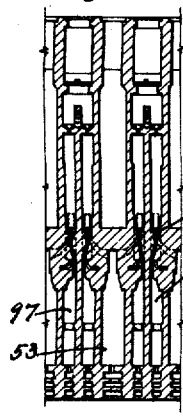
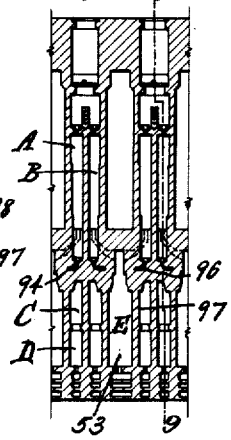
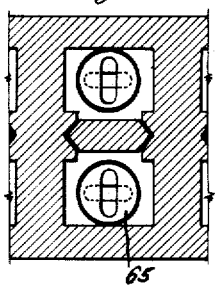
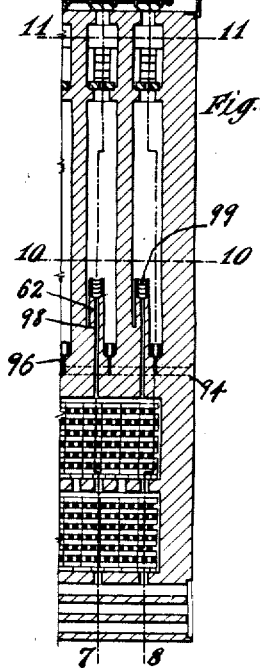
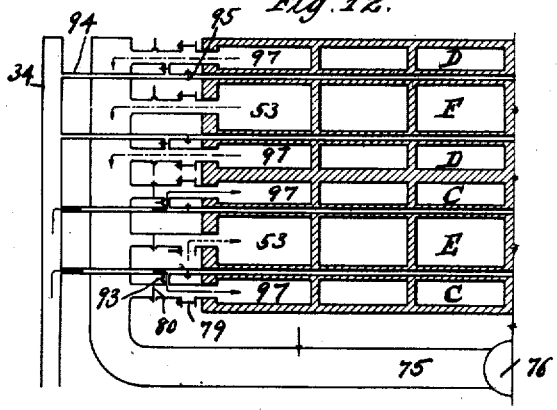
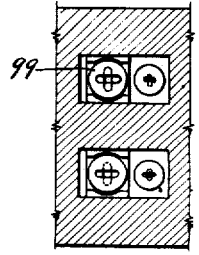
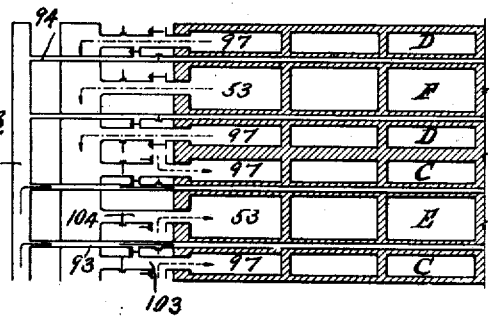
INVENTOR
Elmer J. Crossen
BY
ATTORNEYS

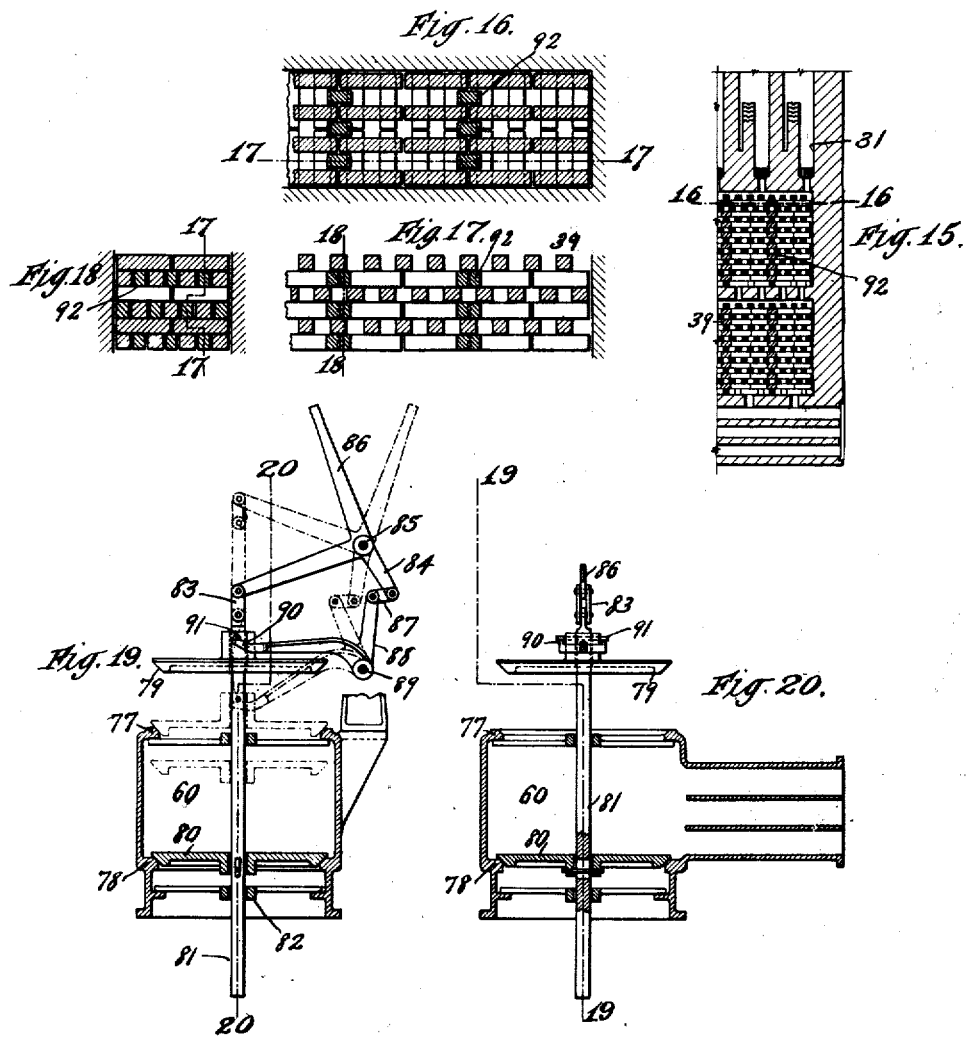

Jan. 6, 1925.  
E. J. CROSSEN  
1,522,421  
APPARATUS FOR THE DESTRUCTIVE DISTILLATION OF COAL AND THE LIKE  
Filed May 16, 1917  5 Sheets-Sheet 5

INVENTOR  
Elmer J. Crossen  
BY  
ATTORNEYS

Patented Jan. 6, 1925.

1,522,421

UNITED STATES PATENT OFFICE.

ELMER J. CROSSEN, OF JOLIET, ILLINOIS.

APPARATUS FOR THE DESTRUCTIVE DISTILLATION OF COAL AND THE LIKE.

Application filed May 16, 1917. Serial No. 168,928.

*To all whom it may concern:*

Be it known that I, ELMER J. CROSSEN, a citizen of the United States, residing at Joliet, county of Will, and State of Illinois, have invented certain new and useful Improvements in Apparatus for the Destructive Distillation of Coal and the like, fully described and represented in the following specification and the accompanying drawings, forming a part of the same.

This invention relates to improvements in structures for the destructive distillation of coal and the like.

Structures of this sort include both coke ovens, in which the driven off gas is a by-product; and gas ovens in which coke is a by-product.

In such ovens as heretofore known, there has been a marked lack of flexibility of use owing to the fact that some coals require, for example, more heating at the top of the ovens, and other coals more heating at the bottom, to obtain the desired quality of products. It has been the practice heretofore to make up ovens in view of a certain quality of coal. If it became desirable to use a different coal, the use of the oven with such coal was attended with serious practical difficulties.

Another disadvantage of known ovens has been the lack of uniform heating throughout the length of an oven chamber. This is objectionable for various reasons. For example, the temperature being higher at certain points, the coal at other points is not coked as fast, and excess gas is supplied with the result that the oven walls at the points now being overheated begin to flux. Another objection to such ovens is that the grade of coke is inferior and the cost of fuel excessive.

It is an object of the present invention to provide apparatus for the destructive distillation of coal and the like that is readily adaptable to use with different grades and mixtures of coal.

It is a further object of the invention to provide apparatus of the class mentioned in which the heat for the oven chambers may be kept uniform throughout.

It is a still further object of the invention to provide apparatus capable of producing a high grade of coke with a marked saving in fuel gas.

With these general objects in view the invention consists in the combinations, arrangements of parts, and details of construction which will first be described in connection with the accompanying drawings, and then more particularly pointed out.

In the drawings—

Figure 7 is a view similar to Fig. 4, showing a different structure, the section being taken on the line 7—7 of Fig. 9 and reduced therefrom;

Figure 8 is a similar view taken on the line 8—8 of Fig. 9;

Figure 9 is a view of this same structure, similar to Fig. 5, the section (enlarged) being taken on the line 9—9 of Fig. 8;

Figure 10 is a cross-sectional view taken on the line 10—10 of Fig. 9;

Figure 11 is a similar view (enlarged) taken on the line 11—11 of Fig. 9;

Figures 12 and 13 are diagrammatic views illustrating the operation of the structure shown in Figs. 7 to 11;

Figure 15 is a vertical transverse section showing a portion of a modification of the regenerator;

Figure 16 is a cross-sectional view taken on the line 16—16 of Fig. 15;

Figure 17 is a similar view on the line 17—17 of Figs. 16 and 18;

Figure 18 is a similar view taken on the line 18—18 of Fig. 17;

Figure 19 is a detail view showing damper operating mechanism, and

Figure 20 is a cross-sectional view taken on the line 20—20 of Fig. 19.

Apparatus for the destructive distillation of coal includes so-called gas ovens in which fuel gas is obtained from outside sources and the derived gas is used for heating and illuminating purposes, and so-called coke ovens in which the derived gases or a part thereof are turned back for fuel, coke being a product in both cases. Both gas and coke ovens ordinarily comprise a battery including a plurality of oven chambers in which the coal is placed; combustion chambers for heating the oven chambers, in which fuel is burned under stack suction, the combustion chambers being reversible, so as to alternately act as combustion chambers and down-takes for the waste gases; and regenerators arranged to alternately act as heaters and receive the heat from the waste gases. In gas ovens, according to usual practice, both the air and fuel gas are passed through the regenerators to be heated prior to their delivery to the combustion chambers, but in coke ovens, the fuel gas, coming from the oven chambers, is not passed through regenerators for heating.

As will hereinafter more fully appear, many of the features of the present invention are applicable to both gas and coke ovens.

Referring to Figs. 1 to 6 and 14, the drawings illustrate part of a gas oven plant for the production of illuminating and heating gas, in which the fuel gas is derived from an outside source and is heated prior to its introduction into the combustion chambers. As will be apparent, the drawings show a transverse battery having a plurality of ovens, the precise number being immaterial.

Figure 1:
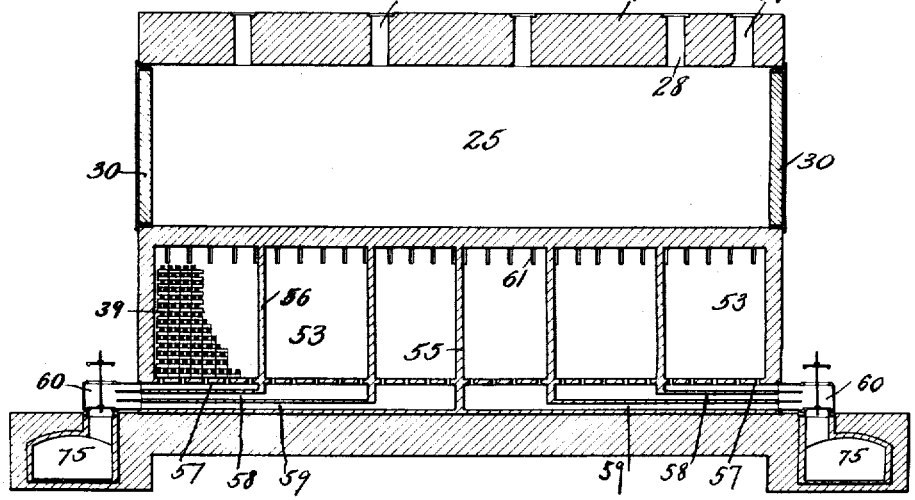
Figure 1 is a longitudinal section through an oven chamber (the section being taken on the line 1—1 of Fig. 3) of apparatus embodying the invention.
Figure 3:
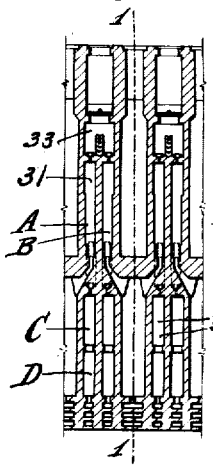
Figure 3 is a cross-sectional view taken on the line 3—3 of Fig. 2.
Figure 4:
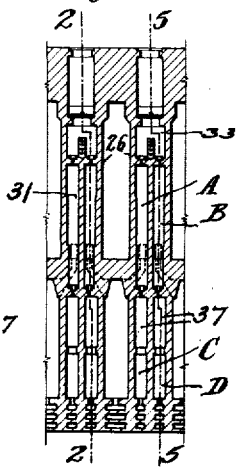
Figure 4 is a similar view taken on the line 4—4 of Fig. 2.
Figure 5:
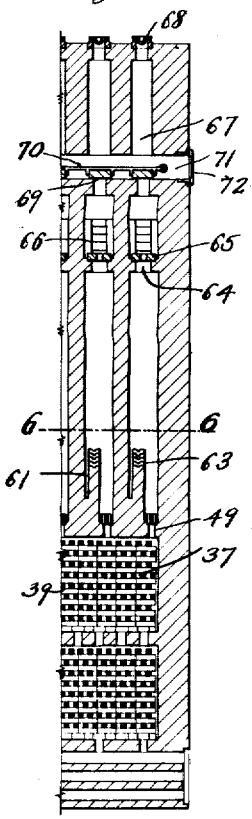
Figure 5 is a vertical transverse sectional view (enlarged) taken on the line 5—5 of Fig. 4.
Figure 14:
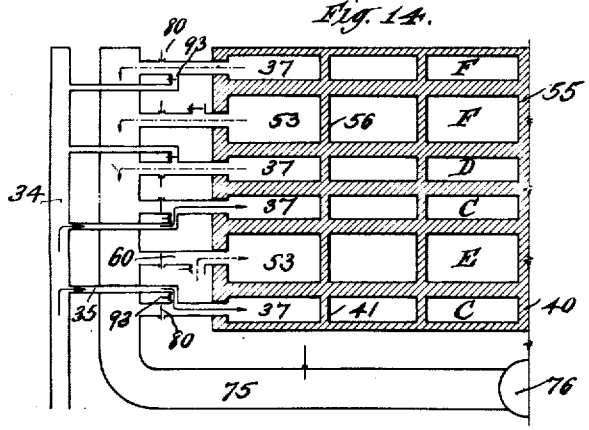
Figure 14 is a similar view illustrating the operation of the structure shown in Figs. 1 to 6.
Figure 6:
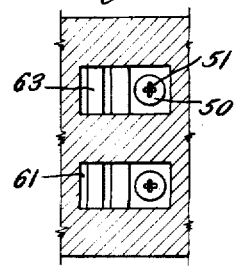
Figure 6 is a cross-sectional view taken on the line 6—6 of Fig. 5.
Figure 21:
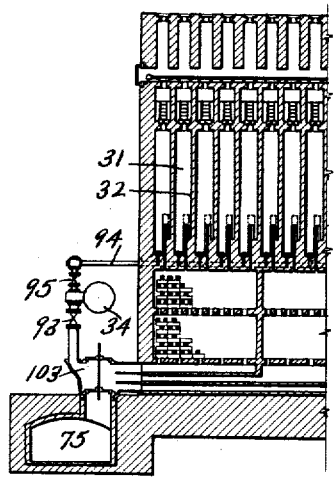
Figure 21 is a view similar to Fig. 2, showing a portion of the combination form of apparatus.
Figure 22:
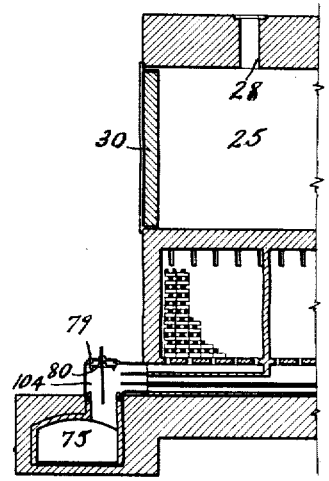
Figure 22 is a view of this form similar to Fig. 1.

The apparatus here shown as an example includes a plurality of oven chambers 25 formed by parallel walls 26, each oven extending from side to side of the battery, as appears in Fig. 1 and having a height relatively much greater than its width, as appears in Figs. 3 and 4. To enable the material to be treated, such as powdered coal, to be fed to the ovens, the top wall 27 of each oven is provided with a plurality of feed openings 28, a further top opening 29 serving as a discharge passage for the volatile and gaseous derivatives of the distillation. In order that the coke produced may be pushed out of the oven by a suitable ram (not shown), each end of each oven chamber is closed by a removable door 30, luted with clay during the operation, of coking to prevent the escape of the gases.

To heat the ovens, the latter have associated therewith a plurality of combustion chambers, and in structures embodying the invention to the best advantage, these combustion chambers are vertically connected in independent reversible pairs. Although capable of various constructions, in the form shown, along the side walls of each oven 25 is a relatively large number of long, narrow combustion chambers 31 formed by parallel walls 32 transverse the ovens. Each combustion chamber along the wall of one oven is connected by a top chamber 33 with the corresponding combustion chamber adjacent the next oven, as shown more clearly in Figs. 3 and 4. Thus, the battery contains a number of sets of vertically connected independent pairs of combustion chambers, the pairs of each set being located transversely between two adjacent ovens.

Although these combustion chambers are alike in construction, since they are reversible in operation, as hereinafter appears, for convenience in description, they are divided in two series A and B, the two chambers adjacent one oven being in one series, those adjacent the next oven in the other series and so on alternately.

To heat the oven chambers, in the present embodiment fuel gas and air are supplied to the chambers of one series for ignition therein. Gas mains 34 for example leading from a suitable source of producer gas, blast furnace gas, or the like, extend along both sides of the battery and connect at suitable intervals with distributing pipes 35 leading to metal chambers 36 which connect with the regenerator heaters.

The structure here illustrated as an example includes regenerators divided transversely of the oven chambers and means is provided for supplying gas uniformly distributed and proportional to the heating capacities of the regenerator sections. As shown, under each combustion chamber is a regenerator heater 37 comprising the customary brick checkerwork 39. For convenience in description, these regenerators are divided into two series, those under combustion chambers A being designated C and those under the chambers B by D. The regenerators 37 are divided midway their length by a wall 40 to form, in effect, two units, each unit receiving gas at its outer end from one of the gas mains. Each unit is divided transversely by partitions 41 into a number of sections, three being shown in this particular construction, and in structures embodying the invention to the best advantage, these sections decrease in size from the ends toward the centre, as appears in Fig. 2. For strengthening purposes, the regenerators have, about midway, their height, a horizontal perforate wall 42. The bottoms of the regenerator sections are formed by a perforate floor 43 and each section is independently connected at the outside face of the structure with the gas supply. To this end, in the base 44 of the battery, under the floor 43 are passages for connecting the regenerator sections with the metal chambers 36. Passages 45 extend under the outer sections of the regenerators; passages 46 under the intermediate sections; and passages 47 under the inner sections, each passage being in connection with the corresponding section and independent of the other passages, as appears in Fig. 2. Each passage opens into one of the metal chambers 36, and when gas is turned on, as hereinafter described, there will be an independent flow through each section of the regenerators, and all short-circuiting is avoided, the gas being uniformly distributed and proportional to the heating capacities of the several sections.

Figure 2:
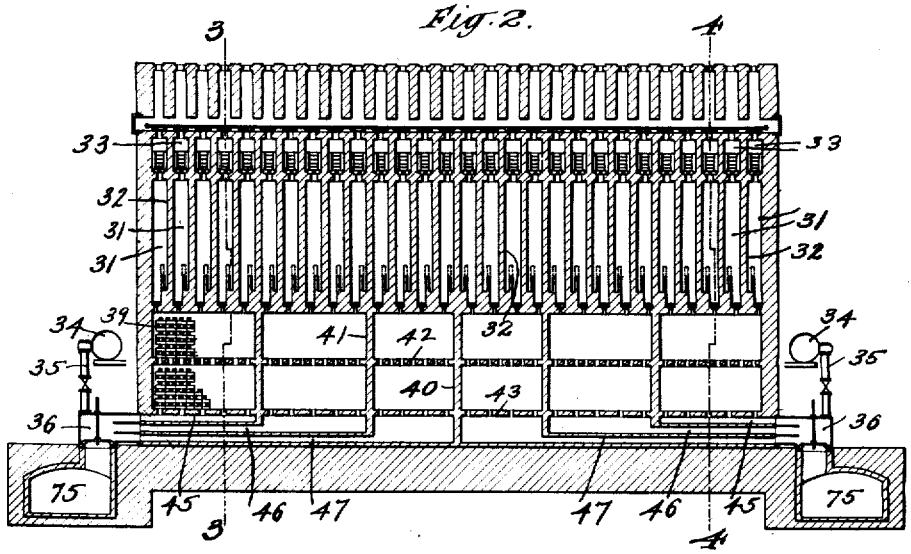
Figure 2 is a similar view taken on the line 2—2 of Fig. 4.

Each section of the regenerator series C connects with a number of the combustion chambers of series A, and each section of the regenerator series D connects with a number of the combustion chambers B, so that all the combustion chambers are in communication with the gas supply. Thus Fig. 2 shows the connection of all the combustion chambers of one set of series A with a regenerator heater of series C, the relations of the other series being identical.

The communicating means in all cases is preferably identical and comprises, for example for each combustion chamber an elongated duct 49 leading from the corresponding regenerator section.

Means is provided for varying the flow of gas into the combustion chambers, and in structures embodying the invention to the best advantage this is accomplished by adjusting the size of the gas-admission ports leading into the combustion chambers. Although capable of various constructions, in the form shown, surrounding each duct 49 is a counter sunk seat for receiving a movable port-adjusting brick 50. In this latter member is an elongated opening 51 to coincide with the duct mouth. By shifting the brick 50 in its seat, by means of a suitable tool inserted from the top of the battery, the opening 51 in the brick and the duct mouth are made to coincide to a greater or less degree, thereby providing a larger or smaller gas-admission port. Although the brick and its seat are shown as circular, they may be any other suitable shape, as, for example, hexagonal.

By means of such a construction, the mixture may be properly proportioned, thus saving fuel. It also makes possible a uniform temperature throughout, as the amount of gas received by each indpendent chamber may be controlled to advance or retard the heating capacity thereof, as occasion may demand. This uniform heating enables the oven to produce a better grade of coke, fuel is saved and there is no overheating in spots which shortens the life of the oven by causing the walls to flux. This control also serves a further purpose hereinafter more fully described.

To provide a suitable combustion mixture, air is also admitted to the combustion chambers and preferably this air is previously heated by being passed through regenerators. In the present embodiment, beneath each oven chamber 25 is a regenerator heater 53 comprising the usual brick checkerwork 39, these regenerators being divided, for the purposes of description, into two series, alternate regenerators being designated as series E, the others as series F. Like the regenerators already described, these are divided into two units by a central wall 55, and each unit is divided into sections decreasing in size toward the centre, by partitions 56. Under each unit are air passages 57, 58 and 59 independent of each other and communicating respectively with the outer, intermediate and inner regenerator sections, these passages being like the gas passages above described. The passages 57, 58 and 59 open into metal chambers 60 located on either side of the battery and these chambers are connected alternately with atmosphere and the stack flues, as hereinafter mentioned. Thus, there is an independent flow of air through each section of the regenerators and all short-circuiting is avoided, the air being distributed and proportioned to the heating capacities of the several sections. Each regenerator section communicates with a number of combustion chambers, so that all the chambers receive a supply of air. To this end in the form here shown opening out from the top of the regenerators, in opposite directions, are air ducts 61 leading to the combustion chambers embracing the corresponding oven. That is, the regenerators of series E feed air to the chambers of series A and the regenerators of series F feed air to the chambers of series B.

The fuel gas and air thus being delivered to the combustion chambers, commingle and ignite, the flame passing up the chambers to heat the adjacent ovens, the waste gases passing down the other chambers to heat the other ovens. The invention in its entirety includes means whereby the path of the gaseous stream in the combustion chambers may be varied in length or in longitudinal location. This variation may be accomplished, by varying the point where the gaseous stream starts at the bottom of the chamber or where it ends at the top of the chamber, or both. While the bottom variation may be effected in various ways, in structures embodying the invention to the best advantage, there is provided means for controlling the point where the gas and air may meet. Although capable of various constructions, in the present embodiment, in each combustion chamber, separating the entrance ports of the gas and air is a wall 62 and this wall is adjustable as to height. In the particular construction shown, the bottom portion of the wall is integral with the chamber wall, and the top surface of this portion is grooved to receive a removable tongued brick 63. This brick is also grooved on its upper face to receive another similar brick. A number of these removable bricks are provided and the wall may be built up thereby to the desired height. If a long flame at the bottom is desired, bricks are removed to shorten the wall to permit the gas and air to commingle and ignite near the bottom of the chamber. Increasing the height of the wall, on the other hand, by adding bricks, elevates the point where the gas and air commingle and ignite, and consequently the path of the gaseous stream is shortened at the bottom.

The elements of combustion having ignited, the flame passes up through the combustion chamber into the top connecting chamber. To regulate the flow of air through the combustion chamber, and thus aid in obtaining a proper mixture, means is provided for adjusting the passageways between the combustion chambers and the top connecting chambers. As shown, in the top wall of each combustion chamber is an elongated duct 64, and about its entrance into the top connecting chamber is a counter-sunk seat for the reception of a movable port-adjusting brick 65. This member, like the brick 50, has formed therein an elongated opening to coincide with the duct mouth. The flow of combustible mixture, and consequently of air, through the duct 64, is regulated by shifting the brick 65 in the same manner as described in connection with the gas-regulating brick 50.

While the top variation may be effected in various ways, in structures embodying the invention to the best advantage, there is provided an adjustable wall or partition whereby the point of deflection of the gaseous stream may be regulated. In this connection, it is noted that as the gaseous stream is under stack suction it will be deflected along the shortest path available in the top connecting chamber. Although capable of various constructions, in the present embodiment a wall extends into the top connecting chamber, and this wall is adjustable as to height. In the particular construction illustrated this wall comprises a plurality of removable bricks 66 similar to those described in connection with the regulating wall at the bottom of the chambers. To obtain a longer path for the gaseous stream at the top of the chamber, the wall is built up to raise the point of deflection. On the other hand, lowering the wall by removal of bricks gives a lower point of deflection and consequently a shorter path.

In connection with the variation of the gaseous stream the invention in its entirety includes means for regulating or adjusting the flame length in accordance with the adjustment of the path of the gaseous stream. This may be accomplished, for example, by varying the gas supply as above described. With the construction described the oven is available for coal or coal mixtures of various qualities, since the burning portion of the gaseous stream may be shortened or lengthened at the top or at the bottom of the several chambers or by adjustment at both top and bottom its position may be vertically shifted, to meet the requirements of the particular coal in use.

It is noted that the construction described is not limited to the arrangement shown of combustion chambers vertically connected in pairs transversely of the oven chambers. It is equally adaptable to any other arrangement of combustion chambers, as, for example, chambers connected in pairs longitudinally or diagonally of the oven chambers.

For purposes of inspection and to make the various adjustments described, in the present embodiment a vertical passage 67 connects each pair of combustion chambers with the top of the battery and these passages are closed at the top by removable hoods 68. In order to prevent the top portion of the battery from becoming unduly heated, these communicating passages are also closed at a point just above the top connecting chambers 33 and means is provided for operating all the closures of a set simultaneously. Although capable of various constructions, in the present embodiment, above the connecting chambers 33, the communicating passages 67 are restricted, as appears in Fig. 2, and associated with the restricted portion is a sliding brick 69 adapted to slide over and close the same. To move these sliding bricks simultaneously for opening and closing the passages, a long rod 70 is provided, located in a transverse passage 71 extending across the top of a set of combustion chambers, as appears in Fig. 2, and each sliding brick is secured to this rod. The transverse passage 71 has end doors 72, and the connecting rod 70 may be operated through these doors by any suitable means, thus causing all the bricks 69 of one set to be moved simultaneously to open or close the passageways.

The air passages for the regenerator sections, as before noted, open into metal chambers 60, and dampers are provided for alternately opening the metal chambers to the atmosphere and the stack flues. Although capable of various constructions, in the form illustrated, extending along each side of the battery are stack flues 75 leading to the stack 76. Each chamber 60 is provided with upper and lower seats 77, 78 for damper disks 79 and 80, the top of the chamber communicating with the atmosphere and the bottom with the stack flues 75, as appears in Fig. 2. The bottom damper disk 80 is secured by a slot and pin connection to a spindle 81 sliding in upper and lower collars 82ª 82 carried by the chambers 60 and the upper damper disk 79 is loosely slidable on this spindle. The upper end of the spindle is pivotally connected by a link 83 with the end of a bell-crank lever 84 fulcrumed at 85 and including an operating handle 86. The other end of the bell-crank lever is pivotally connected by a link 87 with a second bell-crank lever 88 fulcrumed at 89 and having at its other end a finger 90 engaging a pin 91 on the upper damper disk 79.

When the parts are in the full line position of Figs. 19 and 20, the lower damper disk is in its seat, the upper one raised, thus closing the metal chamber from the stack flue and opening it to the atmosphere. When the battery is reversed, as hereinafter described, the operating handle 86 is shifted to the dotted line position of Fig. 19. This raises the spindle 81 and consequently the lower disk 80 is raised from its seat. At the same time the bell-crank lever 88 takes the dotted line position, thus permitting the loosely mounted upper disk 79 to slide down the spindle by gravity into its seat 77. In this position, therefore, the chamber 60 is closed to the atmosphere and open to the stack flue. When the operating handle is returned to the full line position of Fig. 19, the upward movement of the bell-crank lever 88 engaging the pin 91, raises the upper disk 79 and at the same time the spindle is forced down by the bell-crank lever 84 to lower the disk 80 into its seat, and the chamber 60 is again opened to the atmosphere and closed to the stack flue.

With a construction such as that described, the reversing of the air flow is conveniently accomplished and one disk is lowered simultaneously with the elevation of the other disk by a single movement of one operating handle.

In the exemplification illlustrated the metal chambers 36 into which the gas passages for the regenerator sections open and which also communicate with the stack flues, have lower damper disks 80 only, mounted on a spindle, as before described. The tops of the chambers 36 are closed, except for a tapped hole for the reception of the gas pipes 35 and another for the reciprocating spindle. The spindle may be operated to raise and lower the damper disk 80 by any suitable means, such, for example, as that already described, thus alternately opening and closing the chambers to the stack flues.

There is provided means for controlling the flow of the elements of combustion through the regenerator heaters in a manner to avoid the use of expensive expansion joints. Although capable of various constructions, in the form shown, referring particularly to Figs. 15 to 18, flow-controlling walls are built up in the regenerator by means of loose bricks 92. These loose bricks are placed to cooperate with the brick checkerwork, so as to close intervals therein to form a wall at any desired point or points. Thus, Fig. 15 shows a number of vertical walls which aid in preventing short-circuiting but it will be apparent that the walls may be oblique or of any form desired. As the bricks 92 are merely loosely inserted in the brick checkerwork, they may be readily placed wherever desired and the use of the expansion joints required by solid walls is avoided. With such a construction, the flow of the elements of combustion may be controlled in such manner as to obtain the full benefit of the heaters with a consequent saving of fuel.

Assuming the apparatus described to be in operation, gas from the mains 34 is flowing into alternate pairs of metal chambers 36 corresponding to the regenerators 37 of series C, these metal chambers being closed to the stack flues. From the metal chambers the gas flows through the independent passages 45, 46, 47 to the respective sections of the regenerators. At the same time, air is drawn into alternate metal chambers 60 corresponding to alternate regenerators 53, designated in the diagram of Fig. 14 as E, these metal chambers also being closed to the stack flues. From the chambers the air flows through the independent passages 57, 58, 59 into the respective sections of the regenerators. The gas distributed and controlled as before described, flows up through the regenerators and acquires heat from the previously heated brick checkerwork, and enters the combustion chambers 31 of series A by way of the ducts 49, the ports being adjusted as required by means of the shifting bricks 50. The air distributed and controlled as before described, flows up through the regenerators, also acquiring heat therefrom and enters the same combustion chambers via the branching ducts 61. In the combustion chambers, the gas and air commingle and ignite, the resulting flame heating the ovens embraced between these combustion chambers. The burning gases pass into the top connecting chambers 33 via the ducts 64, the ports being adjusted as required by means of the shifting bricks 65, and are deflected therein, as before described. The waste gases then pass downwards through the combustion chambers of series B which are acting as down-takes, the heat of these waste gases serving to heat the corresponding ovens. At the bottom of the down-take combustion chambers B, the waste gases are divided and part flows through the ducts 49 into the regenerators 37 of series D and part through the ducts 61 into the regenerators 53 of series F. Flowing through the regenerators, these hot waste gases heat the brick checkerwork and pass out into the corresponding metal chambers 36 and 60. The metal chambers 36 thus receiving waste gases alternate in pairs with those first mentioned as receiving gas and are closed to the gas supply and open to the stack flues. Similarly the metal chambers 60 receiving waste gases are closed to the atmosphere and open to the stack flues. Consequently, the waste gases pass into the stack flues 75 and escape by the stack 76.

After the battery has been operated in this manner for a suitable period, it is reversed. To this end, the operating handles 86 of the damper mechanism are shifted as before described, and valves 93, which control the gas supply are operated. As a result the gas supply is switched from the metal chambers 36 that originally received gas to those that were originally discharging waste gases, the chambers now receiving gas being closed to the stack flues and the others opened. Similarly the metal chambers 60 are reversed, so that those originally receiving air are now closed to the atmosphere and open to the stack flues, and those originally discharging waste gases are now closed to the stack flues and open to the air. The operation is precisely the same as that described, except that everything is reversed, the gas and air now flowing up through regenerators of series D and F, respectively, into the combustion chambers of series B, and the waste gases flowing down through the chambers of series A and the regenerators of series C and E, and so through the corresponding metal chambers to the flues and stack.

Figs. 7 to 13, inclusive, and 21 and 22, illustrate a construction available both as a gas oven and as a coke oven. It is similar to the construction described, except as to the differences mentioned.

When used as a coke oven, the fuel gas is supplied from the products of distillation and is accordingly delivered to the combustion chambers without being passed through regenerators. To this end, there is formed in the body of the battery, below each row of combustion chambers, a transverse gas passage 94 extending from side to side of the battery and connected with the gas main 34, now receiving gas from the ports 29, by valves 95. These gas passages 94 communicate with elongated ducts 96, each of which leads to a combustion chamber. About the mouth of each duct 96 is a countersunk seat for receiving the port-adjusting brick 50 for regulating the gas flow to each combustion chamber.

Under each combustion chamber is a regenerator 97 corresponding to the regenerator 37 which serves to heat gas when the apparatus is used as a gas oven, and to heat air when used as a coke oven. Connecting each combustion chamber with a regenerator section is an elongated duct 98 which extends up through base 62 of the air and gas dividing wall, as appears in Fig. 9. This wall is adjustable for regulating the point where the air and gas commingle. To this end the top of the wall base 62 is slightly dished to receive a removable brick 99, the upper surface of which is slightly dished to receive a similar brick. Several of these bricks are provided and the wall is built up or taken down just as the wall 62, 63 in the constructions first described. Each of these bricks 99 is formed with an opening 100 corresponding with the duct 98 and top brick may be shifted in its seat to cause its opening to coincide to a greater or less degree with the duct 96, thereby regulating the flow of gas. Thus, when the battery is operating as a gas oven, the fuel gas flow is regulated by the adjustment of the top brick 99; when operating as a coke oven, by the displacement of the brick 50. In either case, that is, whether gas is entering via the duct 96 or the duct 98, the wall regulates the point where the air and gas unite, and so the flame length at the bottom is regulated by building up or lowering this wall. The metal chambers 103 corresponding to the regenerators under the combustion chambers are like those previously described, except that tapped into side elbows are the distributing pipes 35 leading from the mains.

The diagram of Fig. 12 illustrates this structure operating as a gas oven. It is noted that the full line arrows represent fuel gas, the dotted lines, air, and the broken lines, waste gases. The gas passages 94 are all closed by means of the valves 95, and the gas mains 34 are suitably connected to the fuel gas supply. The pin 91 of the damper mechanism is removed so the damper disk 79 remains closed at all times and the metal chambers are alternately feeding fuel gas and discharging waste gases. The other metal chambers 104, that is, those corresponding to the regenerators under the oven chambers, are like the chambers 60 already described, and are alternately feeding air and discharging waste gases. Gas, therefore, from the mains 34, via the chambers 103, enters the regenerators 97 of series C, while air is passing through the chambers 104 to the regenerators 53 of series E. As will appear from the diagram, the waste gases from D series of regenerators 97 pass out through the remaining chambers 103 to the flues and from F series of regenerators 53, through the remaining chambers 104 to the flues. The operation is the same as that described in connection with the first construction, except that the path of the gas from the regenerators 97 (which correspond to the regenerators 37) to the combustion chambers includes the duct 98, and adjustment of the flow is made by the shifting of the top brick 99 of the dividing wall.

When operating as a coke oven, the fuel gas mains 34 are connected to the supply of gas from the ovens, the valves 93 are all closed and the valves 95 of one series are opened, so that fuel gas passes from the mains into the gas passages 94, and the distributing pipes 35 become inactive. In this use of the oven, all the receiving regenerators receive air only. To this end the pins 91 are replaced in the damper mechanism of the chambers 103 so the disks 79 may be opened to permit air to enter. The other chambers 104 continue to receive air as in the gas oven operation.

The diagram of Fig. 13 illustrates this operation of the structure as a coke oven, and in view of the above description it will be clear without further remarks.

What is claimed is:

1. In apparatus for the destructive distillation of carboniferous material such, for example, as coal, and in combination, a plurality of ovens, combustion chambers arranged along the longitudinal walls of each oven, means for supplying gaseous fuel for ignition in said chambers, and means for varying the length of the path of the gaseous stream in said chambers.

2. In apparatus for the destructive distillation of carboniferous material such, for example, as coal, and in combination, a plurality of ovens, combustion chambers arranged along the longitudinal walls of said ovens, means for supplying gaseous fuel for ignition in said chambers, and means whereby the path of the gaseous stream in said chambers may be varied in length.

3. In apparatus for the destructive distillation of carboniferous material such, for example, as coal, and in combination, a plurality of ovens, combustion chambers arranged along the longitudinal walls of each oven, means for supplying gaseous fuel for ignition in one group of said chambers, the other group of chambers serving as downtakes for the waste gases, means whereby the path of the gaseous stream in a chamber of the first group may be varied, and means for controlling the fuel supply to said chamber.

4. In apparatus for the destructive distillation of carboniferous material such, for example, as coal, and in combination, a plurality of ovens, combustion chambers arranged along the longitudinal walls of each oven, means for supplying gaseous fuel for ignition in some of said chambers, the other chambers serving as downtakes for the waste gases, and adjustable partitions adjacent the top of the first mentioned chambers, whereby the point of deflection of the gaseous stream may be regulated.

5. In apparatus for the destructive distillation of carboniferous material such, for example, as coal, and in combination, a plurality of ovens, combustion chambers arranged along the longitudinal walls of each oven, means for supplying gaseous fuel for ignition in some of said chambers, the other chambers serving as downtakes for the waste gases, adjustable partitions adjacent the top of the first mentioned chambers, whereby the point of deflection of the gaseous stream may be regulated, and means for regulating the flame length in accordance with the adjustment of the path of the gaseous stream.

6. In apparatus for the destructive distillation of carboniferous material such, for example, as coal, and in combination, a plurality of ovens, combustion chambers arranged along the two longitudinal walls of said ovens and independently connected in reversible pairs, means for supplying gaseous fuel for ignition in either chamber of each pair, the other chambers serving as downtakes for the waste gases, and means for varying the length of that portion of the gaseous stream that is in the group of chambers receiving fuel.

7. In apparatus for the destructive distillation of carboniferous material such, for example, as coal, and in combination, a plurality of ovens, combustion chambers arranged along the two longitudinal walls of said ovens and independently connected in reversible pairs, means for supplying gaseous fuel for ignition in either chamber of each pair, the other chambers serving as downtakes for the waste gases, means for varying the length of that portion of the gaseous stream that is in the group of chambers receiving fuel, and means for regulating the fuel supply to adjust the flame length in accordance with the variation of the gaseous stream.

8. In apparatus for the destructive distillation of carboniferous material such, for example, as coal, and in combination, a plurality of ovens, combustion chambers arranged along the longitudinal walls of each oven and independently connected in reversible pairs, means for supplying gaseous fuel for ignition in either chamber of each pair, the other chambers serving as downtakes for the waste gases, and a wall, adjustable in height, between the chambers of each pair, whereby the point of deflection of the gaseous stream may be regulated.

9. In an apparatus for the destructive distillation of carboniferous material such, for example, as coal, and in combination, a plurality of ovens, combustion chambers arranged alongside the longitudinal walls of said ovens and independently connected in reversible pairs, means for supplying gaseous fuel for ignition in either chamber of each pair, the other chambers serving as downtakes for the waste gases, and an adjustable wall between the chambers of each pair, said wall comprising a plurality of readily removable and insertible superimposed bricks, whereby the point of deflection of the gaseous stream may be regulated.

10. In apparatus for the destructive distillation of carboniferous material such, for example, as coal, and in combination, a plurality of ovens, combustion chambers arranged along the longitudinal walls of each oven, gas and air ports associated with the bottom of some of said chambers for the delivery of the elements of combustion for ignition therein, the other chambers serving as downtakes for the waste gases, and adjustable elements within said first group of chambers for controlling the point where the gas and air delivered from said ports may meet.

11. In apparatus for the destructive distillation of carboniferous material such, for example, as coal, and in combination, a plurality of ovens, combustion chambers arranged along the longitudinal walls of each oven, gas and air ports associated with the bottom of some of said chambers for the delivery of the elements of combustion for ignition therein, the other chambers serving as downtakes for the waste gases, adjustable elements within said first group of chambers for controlling the point where the gas and air mix for ignition, and means for regulating the flame length in accordance with the adjustment of the path of the ignited stream.

12. In apparatus for the destructive distillation of carboniferous material such, for example, as coal, and in combination, a plurality of ovens, combustion chambers arranged along the longitudinal walls of said ovens, gas and air ports associated with the bottom of some of said chambers for the delivery of the elements of combustion for ignition therein, the other chambers serving as downtakes for the waste gases, and adjustable partitions between the gas and air ports for controlling the point where the gas and air meet for ignition.

13. In apparatus for the destructive distillation of carboniferous material such, for example, as coal, and in combination, a plurality of ovens, combustion chambers arranged alongside the longitudinal walls of each oven and having gas ports and air ports opening thereinto, adjustable walls in said chambers separating the air and gas ports, said walls comprising a plurality of readily removable and insertible superimposed bricks.

14. In apparatus for the destructive distillation of carboniferous material such, for example, as coal, and in combination, a plurality of ovens, combustion chambers arranged along the longitudinal walls of each oven and independently connected in reversible pairs, gas and air ports associated with said chambers for the delivery of the elements of combustion for ignition alternately in one chamber of each pair, the other chambers serving as downtakes for the waste gases, and adjustable elements within the chambers for controlling the point where the gas and air delivered from said ports may meet.

15. In apparatus for the destructive distillation of carboniferous material such, for example, as coal, and in combination, a plurality of ovens, combustion chambers arranged along the longitudinal walls of each oven and independently connected in reversible pairs, gas and air ports associated with said chambers for the delivery of the elements of combustion for ignition alternately in one chamber of each pair, the other chambers serving as downtakes for the waste gases, and an adjustable partition between said ports in each of said chambers of the group receiving fuel whereby the point where the air and gas mix for ignition may be regulated.

16. In apparatus for the destructive distillation of carboniferous material such, for example, as coal, and in combination, a plurality of ovens, combustion chambers arranged along the longitudinal walls of each oven and independently connected in reversible pairs, gas and air ports associated with said chambers for the delivery of the elements of combustion for ignition alternately in one chamber of each pair, the other chambers serving as downtakes for the waste gases, and a wall of readily removable and insertible superimposed bricks between said ports, whereby the point where the air and gas mix for ignition may be regulated.

17. In apparatus for the destructive distillation of carboniferous material such, for example, as coal, and in combination, a plurality of ovens, combustion chambers arranged along the longitudinal walls of each oven, means for supplying gaseous fuel and air for ignition in some of said chambers, the other chambers serving as downtakes for the waste gases, adjustable partitions adjacent the top of the first mentioned chambers, whereby the point of deflection of the gaseous stream may be regulated, and adjustable elements within said first mentioned chambers for controlling the point where the gas and air mix for ignition.

18. In apparatus for the destructive distillation of carboniferous material such, for example, as coal, and in combination, a plurality of ovens, combustion chambers arranged along the longitudinal walls of each oven, means for supplying gaseous fuel and air for ignition in some of said chambers, the other chambers serving as downtakes for the waste gases, adjustable partitions adjacent the top of the first mentioned chambers, whereby the point of deflection of the gaseous stream may be regulated, adjustable elements within said first mentioned chambers for controlling the point where the gas and air mix for ignition, and means for regulating the flame length in accordance with the adjustment of the path of the ignited stream.

19. In apparatus for the destructive distillation of carboniferous material such, for example, as coal, and in combination, a plurality of ovens, combustion chambers arranged along the longitudinal walls of said ovens and independently connected in reversible pairs, means for supplying gaseous fuel and air for ignition in either chamber of each pair, the other chambers serving as downtakes for the waste gases, adjustable partitions adjacent the tops of the chambers whereby the point of deflection of the gaseous stream may be regulated, and adjustable elements within the chambers for controlling the point where the gas and air mix for ignition.

20. In apparatus for the destructive distillation of carboniferous material such, for example, as coal, and in combination, a plurality of ovens, combustion chambers arranged along the two longitudinal walls of said ovens, fuel gas-supplying means and air-supplying means for some of said chambers, the other chambers serving as downtakes for the waste gases, adjustable valve elements for said gas-supplying means, and adjustable valve elements in said first mentioned group of chambers above the point where the gas and air mix for ignition, for regulating the size of the opening through which the mixture passes.

21. In apparatus for the destructive distillation of carboniferous material such, for example, as coal, and in combination, a plurality of ovens, combustion chambers arranged along the two longitudinal walls of each oven and independently connected in reversible pairs, means for supplying fuel gas and air to said combustion chambers, means for varying the flow of gas in said combustion chambers, and angularly movable means near the upper end of the chambers for varying the mixture of gas and air in said combustion chambers.

22. In apparatus for the destructive distillation of carboniferous material such, for example, as coal, and in combination, a plurality of ovens, combustion chambers arranged along the longitudinal walls of each oven and each having an adjustable gas inlet passage, an inlet passage and an adjustable fuel regulating passage associated therewith, and means for varying the length of the path of the gaseous stream in said chambers.

23. In apparatus for the destructive distillation of carboniferous material such, for example, as coal, and in combination, a plurality of ovens, and vertical combustion chambers arranged along the longitudinal walls of said ovens, and independently connected in reversible pairs transverse to said oven walls.

24. In apparatus for the destructive distillation of carboniferous material such, for example, as coal, and in combination, a plurality of ovens, combustion chambers arranged along the two longitudinal walls of each oven and independently connected in reversible pairs transverse the oven walls, means for supplying fuel gas to the combustion chambers, and means for varying the flow of gas into said chambers to vary the amount delivered.

25. In apparatus for the destructive distillation of carboniferous material such, for example, as coal, and in combination, a plurality of ovens, combustion chambers arranged along the two longitudinal walls of each oven and independently connected in reversible pairs, means for supplying fuel gas to said combustion chambers, and means for varying the flow of gas into any one of said chambers to vary the amount delivered.

26. In apparatus for the destructive distillation of carboniferous material such, for example, as coal, and in combination, a plurality of ovens, combustion chambers arranged along the two longitudinal walls of each oven, means for supplying elements of combustion to said chambers, regenerator heaters through which at least one of the elements of combustion passes, and means for controlling the path of the flow of said element or elements of combustion through said regenerators, comprising a movably located wall.

27. In apparatus for the destructive distillation of carboniferous material such, for example, as coal, and in combination, a plurality of ovens, combustion chambers arranged along the two longitudinal walls of each oven, means for supplying elements of combustion to said chambers, regenerator heaters comprising brick checkerwork through which at least one of the elements of combustion passes, and a wall for controlling the path of the flow of said element or elements of combustion through said regenerators, said wall comprising a plurality of bricks loosely inserted on said brick checkerwork.

28. Apparatus for the destructive distillation of carboniferous material such, for example, as coal, comprising a long narrow oven, combustion chambers arranged along the two longitudinal walls of said oven, a regenerator heater located beneath each row of combustion chambers and divided into individual sections diminishing in size from the outer to the other end of the regenerator, an independent gas passage for each section, means for supplying gas to said regenerator, and passages from the regenerator to said combustion chambers.

29. In a coke oven comprising coking chambers and heating walls located at the sides of the coking chambers and formed with vertical flues and vertical flue division walls separating adjacent vertical flues and a space above each of said flue division walls connecting the vertical flues at opposite sides thereof, the improvement which consists in movable brick parts at the top of said flue division walls for varying the height thereof.

30. In a coke oven comprising coking chambers and heating walls located at the sides of the coking chambers and formed with vertical flues and vertical flue division walls separating adjacent flue spaces and a space above each division wall connecting the flues at opposite sides thereof, and having vertical channels in the upper portions of the oven structure communicating at their lower ends with said connecting spaces, the improvement which consists in brick parts mounted on the upper ends of said flue division walls and insertible and removable through said channels for varying the height of the said flue division walls, said brick and division walls being formed with interlocking surfaces to prevent accidental displacement of the brick when mounted on the flue division walls.

31. In apparatus for the destructive distillation of carboniferous material such, for example, as coal, and in combination, a plurality of ovens, combustion chambers arranged along the longitudinal walls of said ovens, means for supplying gaseous fuel for ignition in said chambers, and means whereby the path of the gaseous stream in said chambers may be varied in longitudinal location.

32. In apparatus for the destructive distillation of carboniferous material such, for example, as coal, and in combination, a plurality of ovens, combustion chambers arranged along the two longitudinal walls of said ovens and independently connected in reversible pairs, means for supplying gaseous fuel for ignition in either chamber of each pair, the other chambers serving as down takes for the waste gases, and means for varying the longitudinal location of that portion of the gaseous stream that is in the group of chambers receiving fuel.

33. In apparatus for the destructive distillation of carboniferous material such, for example, as coal, and in combination, a plurality of ovens, combustion chambers arranged along the two longitudinal walls of said ovens and independently connected in reversible pairs, means for supplying gaseous fuel for ignition in either chamber of each pair, the other chambers serving as downtakes for the waste gases, means for varying the longitudinal location of that portion of the gaseous stream that is in the group of chambers receiving fuel, and means for regulating the fuel supply to adjust the flame length in accordance with the variation of the gaseous stream.

34. In apparatus for the destructive distillation of carboniferous material such, for example, as coal, and in combination, a plurality of ovens, combustion chambers arranged along the longitudinal walls of each oven, connections delivering separately gas and air to the lower part of some of said chambers for ignition therein, the other chambers serving as downtakes for waste gases, and adjustable elements associated with said first group of chambers for controlling the point where the gas and air delivered thereto may meet.

In testimony whereof, I have hereunto set my hand.

ELMER J. CROSSEN.

lation of carboniferous material such, for example, as coal, comprising a long narrow oven, combustion chambers arranged along the two longitudinal walls of said oven, a regenerator heater located beneath each row of combustion chambers and divided into individual sections diminishing in size from the outer to the other end of the regenerator, an independent gas passage for each section, means for supplying gas to said regenerator, and passages from the regenerator to said combustion chambers.

29. In a coke oven comprising coking chambers and heating walls located at the sides of the coking chambers and formed with vertical flues and vertical flue division walls separating adjacent vertical flues and a space above each of said flue division walls connecting the vertical flues at opposite sides thereof, the improvement which consists in movable brick parts at the top of said flue division walls for varying the height thereof.

30. In a coke oven comprising coking chambers and heating walls located at the sides of the coking chambers and formed with vertical flues and vertical flue division walls separating adjacent flue spaces and a space above each division wall connecting the flues at opposite sides thereof, and having vertical channels in the upper portions of the oven structure communicating at their lower ends with said connecting spaces, the improvement which consists in brick parts mounted on the upper ends of said flue division walls and insertible and removable through said channels for varying the height of the said flue division walls, said brick and division walls being formed with interlocking surfaces to prevent accidental displacement of the brick when mounted on the flue division walls.

31. In apparatus for the destructive distillation of carboniferous material such, for example, as coal, and in combination, a plurality of ovens, combustion chambers arranged along the longitudinal walls of said ovens, means for supplying gaseous fuel for ignition in said chambers, and means whereby the path of the gaseous stream in said chambers may be varied in longitudinal location.

32. In apparatus for the destructive distillation of carboniferous material such, for example, as coal, and in combination, a plurality of ovens, combustion chambers arranged along the two longitudinal walls of said ovens and independently connected in reversible pairs, means for supplying gaseous fuel for ignition in either chamber of each pair, the other chambers serving as down takes for the waste gases, and means for varying the longitudinal location of that portion of the gaseous stream that is in the group of chambers receiving fuel.

33. In apparatus for the destructive distillation of carboniferous material such, for example, as coal, and in combination, a plurality of ovens, combustion chambers arranged along the two longitudinal walls of said ovens and independently connected in reversible pairs, means for supplying gaseous fuel for ignition in either chamber of each pair, the other chambers serving as downtakes for the waste gases, means for varying the longitudinal location of that portion of the gaseous stream that is in the group of chambers receiving fuel, and means for regulating the fuel supply to adjust the flame length in accordance with the variation of the gaseous stream.

34. In apparatus for the destructive distillation of carboniferous material such, for example, as coal, and in combination, a plurality of ovens, combustion chambers arranged along the longitudinal walls of each oven, connections delivering separately gas and air to the lower part of some of said chambers for ignition therein, the other chambers serving as downtakes for waste gases, and adjustable elements associated with said first group of chambers for controlling the point where the gas and air delivered thereto may meet.

In testimony whereof, I have hereunto set my hand.

ELMER J. CROSSEN.

Certificate of Correction.

It is hereby certified that in Letters Patent No. 1,522,421, granted January 6, 1925, upon the application of Elmer J. Crossen, of Joliet, Illinois, for an improvement in "Apparatus for the Destructive Distillation of Coal and the Like," an error appears in the printed specification requiring correction as follows: Page 9, line 68, claim 22, before the word "inlet" insert the word *air;* and that the said Letters Patent should be read with this correction therein that the same may conform to the record of the case in the Patent Office.

Signed and sealed this 10th day of February, A. D. 1925.

[SEAL.]

KARL FENNING,
*Acting Commissioner of Patents.*

Certificate of Correction.

It is hereby certified that in Letters Patent No. 1,522,421, granted January 6, 1925, upon the application of Elmer J. Crossen, of Joliet, Illinois, for an improvement in "Apparatus for the Destructive Distillation of Coal and the Like," an error appears in the printed specification requiring correction as follows: Page 9, line 68, claim 22, before the word "inlet" insert the word *air;* and that the said Letters Patent should be read with this correction therein that the same may conform to the record of the case in the Patent Office.

Signed and sealed this 10th day of February, A. D. 1925.

[SEAL.]

KARL FENNING,
*Acting Commissioner of Patents.*